United States Patent [19]

Hansen

[11] Patent Number: 4,505,086
[45] Date of Patent: Mar. 19, 1985

[54] WOOD JOINT CUTTER AND METHOD THEREFOR

[76] Inventor: Frede O. Hansen, 770 W. 19th Ave., Vancouver, B. C., Canada, V5Z 1X2

[21] Appl. No.: 558,452

[22] Filed: Dec. 6, 1983

Related U.S. Application Data

[63] Continuation-in-part of Ser. No. 378,982, May 17, 1982, abandoned.

[51] Int. Cl.³ ............................................. B27M 1/00
[52] U.S. Cl. ........................................ 52/593; 144/83; 144/218; 144/231; 144/368; 144/371; 403/364
[58] Field of Search .............................. 144/82, 85–89, 144/90 R, 90 A, 218, 231, 236, 237, 233, 359, 363, 369, 371, 373, 374; 403/364; 52/593

[56] References Cited

U.S. PATENT DOCUMENTS

| 492,675 | 2/1893 | Hardee | 144/90 A |
| 561,721 | 6/1896 | Mertz | 144/236 |
| 1,014,794 | 1/1912 | Wierbach | 144/231 |
| 1,432,580 | 10/1922 | Vauclain | 144/237 |
| 1,533,547 | 4/1925 | Hathaway | 144/237 |
| 2,193,359 | 3/1940 | Haas | 144/134 A |
| 2,353,202 | 7/1944 | Tautz | 144/134 A |
| 2,439,486 | 4/1948 | Ray | 144/134 A |
| 3,008,501 | 11/1961 | Hammer | 144/3 R X |
| 3,360,023 | 12/1967 | Rutzebeck | 144/231 |
| 3,986,543 | 10/1976 | Slayton | 144/236 |

FOREIGN PATENT DOCUMENTS 2256807 9/1975 France ............................. 144/231

Primary Examiner—W. D. Bray
Attorney, Agent, or Firm—Shlesinger Arkwright Garvey & Fado

[57] ABSTRACT

A rotary cutting tool with at least a first set and a second set of teeth attached to a power router for cutting a joint component consisting of at least two tongues and at least two grooves alternating with the tongues in the end, edge or at the side of a piece of construction material. The distance between the two sets of teeth is equal to the width of the second set of teeth. The depths of the grooves are governed by a spacer positioned between the first and second sets of teeth.

16 Claims, 12 Drawing Figures

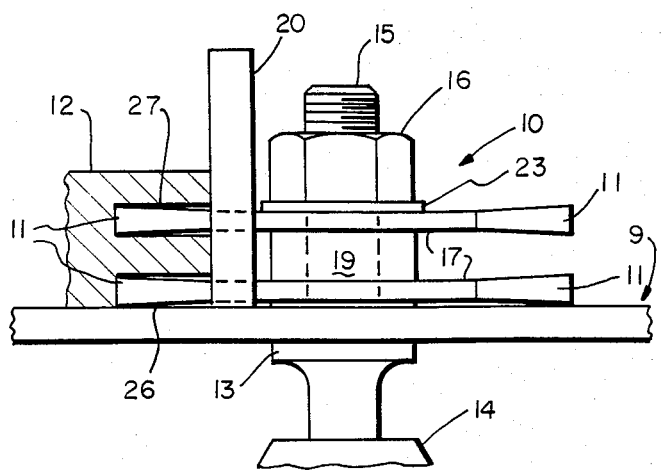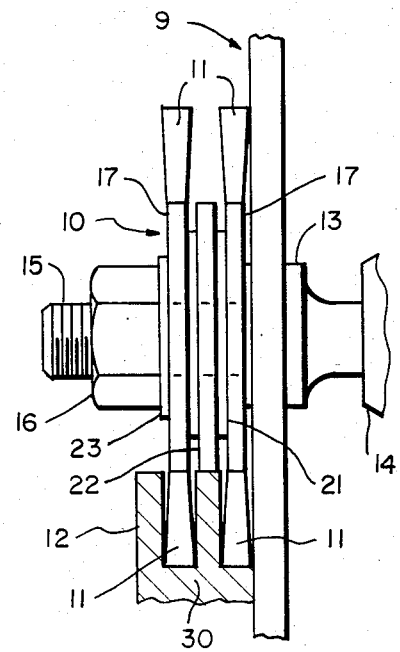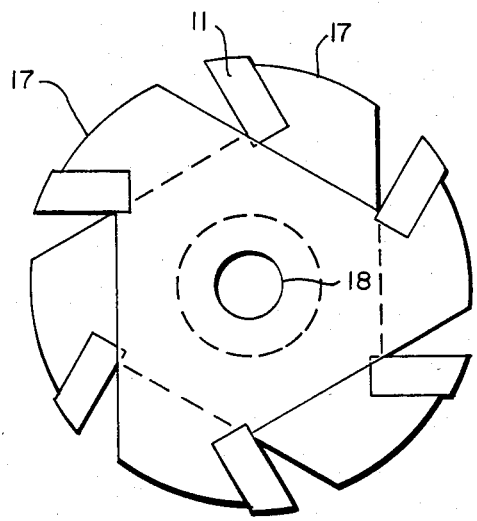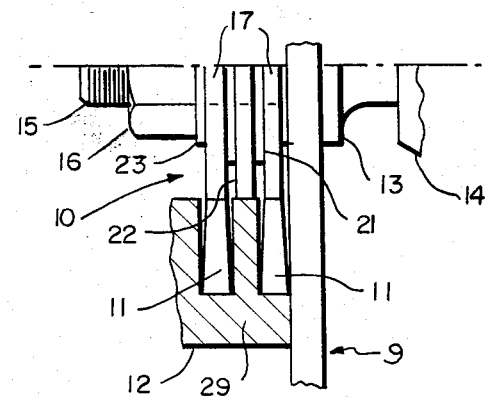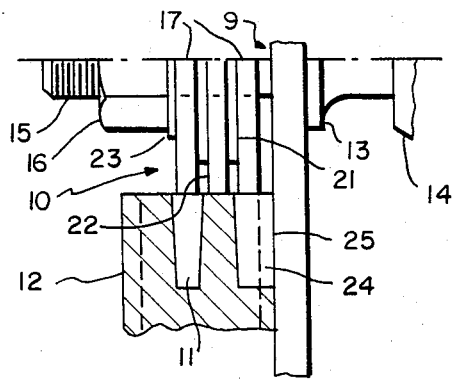

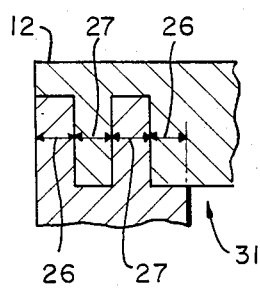
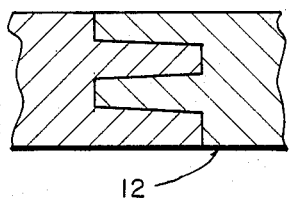
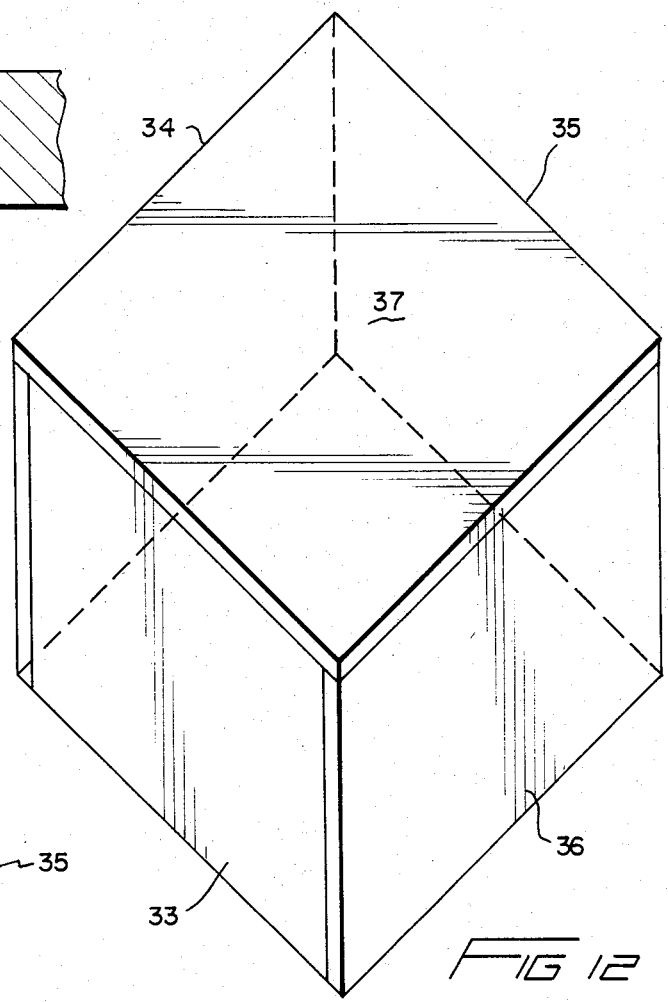
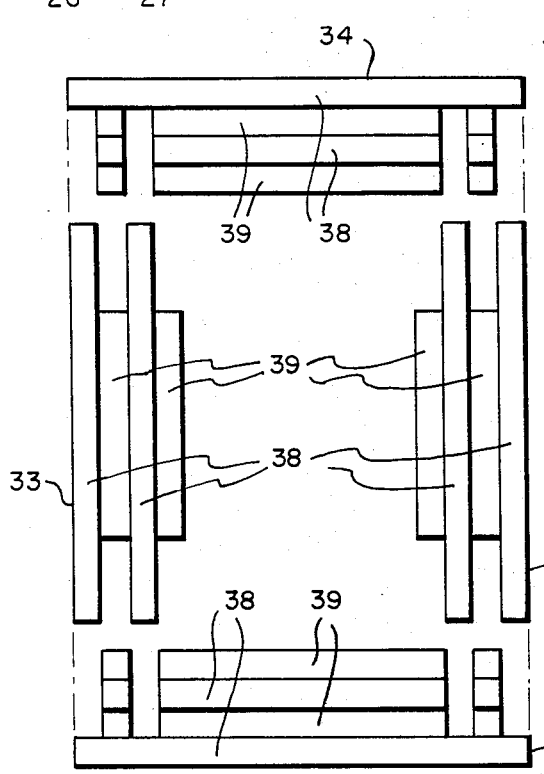
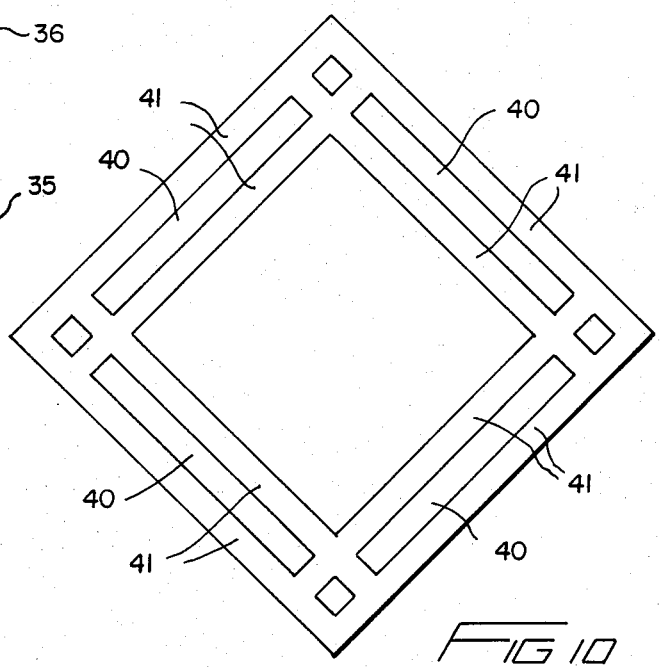
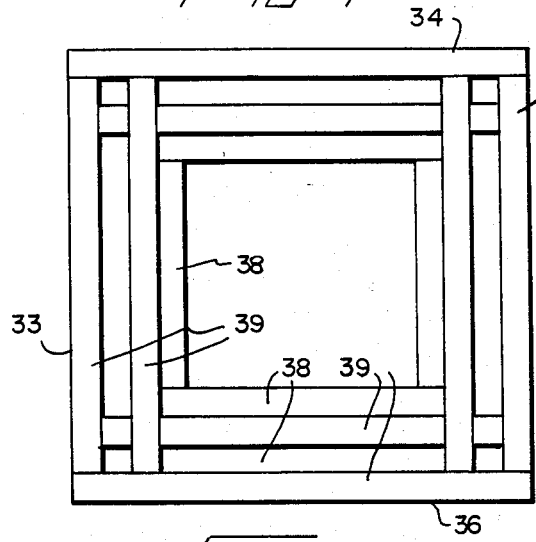

WOOD JOINT CUTTER AND METHOD THEREFOR

FIELD OF THE INVENTION

This is a continuation-in-part of my original patent application, Ser. No. 378,982, entitled "Wood Joint Cutter", which was filed on May 17, 1982, now abandoned.

This invention relates to a power operable tool designed specifically for making a joint component for wood and similar building construction materials, which can then be joined together to form drawers, cabinets, and the like. More particularly, this invention is directed to a rotary cutting tool which can be attached to a power router for purposes of cutting a joint component consisting of at least two tongues and at least two grooves alternating with one another in the end, edge or at the side of a piece of construction material.

BACKGROUND OF THE INVENTION

At the present time, it is very difficult for amateur woodworkers to construct precision fitting drawers, fine finished cabinets, and the like, up to the standard of a professional cabinet worker because to do so requires a large numer of special tools adapted to cut specific components for specific applications. For example, one type of tool must be used specifically for cutting a male component for a joint, while a second type of tool must be used to cut a complementary female component for the joint. To date, there is not available a single tool which can be used by both professionals and amateurs to cut a single precision joint component which can be used for both the corners, edges, sides and ends of wood pieces, and fitted together to form precision fitting construction articles.

The applicant is aware of the following identified patents which have possible relevance in this field:

|  | Issue Date | Inventor |
| --- | --- | --- |
| U.S. Pat. No. | | |
| 492,676 | February, 1893 | Hardee |
| 535,492 | March, 1895 | Erickson |
| 561,721 | June, 1896 | Mertz |
| 1,014,794 | January, 1912 | Weirbach |
| 1,172,776 | February, 1916 | Engler |
| 1,432,580 | October, 1922 | Vauclain |
| 1,533,547 | April, 1925 | Hathaway |
| 3,360,023 | December, 1967 | Rutzebeck |
| 3,986,543 | October, 1976 | Slayton et al. |
| Swiss Patent No. | | |
| 151,412 | December, 1931 | Wunsch |

SUMMARY OF THE INVENTION

I have invented a novel power operable rotary tool for making a joint component for use in joining the corners, edges and ends of boards or plywood together, as well as joining pieces of wood together for assembly into wider components, for the purpose of constructing precision fitting components of drawers, cabinets and the like. The rotary tool is adapted for use as an attachment on a standard portable or stationary router. The tool produces a joint component for a wood piece which is precision cut, identical to and fits together precisely with the identical shape of joint component cut in a complementary wood piece. One joint component design is used on all edges, sides or ends of the construction pieces. The joint component can be cut in either the ends, edges or sides of wood pieces and comprises at least two alternating tongues and grooves, sized according to the thickness of the wood piece in which the joint component is to be cut. Since the same joint component construction can be used at all times, only one tool for cutting the joint component is required. The rotary tool used for cutting the joint component can be adjusted as required to accommodate different thicknesses of wood pieces. A critical feature of the tool is that the width of the teeth used to cut the central groove is identical to the distance between the teeth used to cut the central groove and the teeth used to cut the groove at the edge. Also, the depth of the groove is identical to the elevation of the tongue. Further, the width of the tongue at the side of the wood piece measured from the edge or side of the wood piece is identical to the width of the groove at the edge of the wood piece measured from the edge or side on a matching piece.

The invention is directed to a rotary tool for making at least two alternating tongues and grooves in a construction material comprising: (a) an elongated shank having opposite ends, the first end being adapted to be gripped in a router chuck means and the second end being adapted to receive a securing means; (b) a construction material guide positioned proximate the first end; (c) the shank between the construction material guide means and the end securing means being adapted to carry at a position adjacent the construction material guide, a first cutter base provided with at least one cutting tooth positioned at the periphery of the cutter base, and at the second end, a second cutter base provided with at least one cutting tooth positioned at the periphery of the cutter base, the width of the cutting tooth on the first cutter base being equal to or larger than the width of the tooth on the second cutter base; and (d) the shank between the first cutter base and the second cutter base carrying a spacing member which causes the distance between the tooth on the first cutter base and the tooth on the second cutter base to be equal to the width of the tooth on the second cutter base.

DRAWINGS

In the drawings:

FIG. 1 represents a side elevation view of the joint cutter, mounted in horizontal position on a router table with a wood piece being fed to the joint cutter;

FIG. 2 represents a side elevation view of the joint cutter, oriented in vertical position in the rotating chuck of a portable router, cutting a joint component in the end of a wood piece;

FIG. 3 represents a side elevation view of the dual cutter base and cutting teeth of the joint cutting tool;

FIG. 4 represents a side elevation view of a section of the joint cutter, oriented in a vertical position in the rotating chuck of a portable router cutting a joint component in the edge of a wood piece;

FIG. 5 represents a side elevation view of a section of the joint cutter oriented in vertical position in the rotating chuck of a portable router with the cutter fitted with one standard set of teeth and one oversize set of teeth;

FIG. 6 represents a side elevation view of a section of the joint cutter oriented in a vertical position in the rotating chuck of a portable router with the cutter fitted to cut a joint component in the end of an oversize piece of wood;

FIG. 7 represents a plan elevation view of the manner in which a joint component cut in the end of one wood piece fits precisely with the matching joint component cut at the edge of the side of an adjacent wood piece;

FIG. 8 represents a plan elevation view of the manner in which a joint component cut in the end of one wood piece fits into the corresponding joint component cut in the end of a matching wood piece;

FIG. 9 represents a plan, exploded view of the manner in which a plurality of joint components can be cut in a number of wood pieces in order to construct a cubical wood article including a square end piece;

FIG. 10 represents a plan view of the manner in which tongues and grooves forming the joint components are cut around the edges of the square end piece illustrated in FIG. 9;

FIG. 11 represents a plan view of the components illustrated in FIG. 9 when joined together; and FIG. 12 represents a generalized perspective view of the cube-shaped article formed by the components represented in FIGS. 9 and 10.

DETAILED DESCRIPTION OF AN EMBODIMENT OF THE INVENTION

Referring to FIG. 1, a side elevation view of the rotary joint cutting tool 10 is shown secured in horizontal position on shank 15 above the base or table 9 (referred to herein as guide 9) of a router. The joint cutting tool 10 is constructed of two cutter bases 17, each carrying a plurality of cutting teeth 11. These are mounted in parallel spaced orientation on a shank 15 which has an inner end adapted to be gripped in a router chuck 14. The outer end of the shank 15 is threaded to receive a nut 16. The shank 15 is shouldered (shoulder 13) to carry at least one pair of cutter bases 17, each of which is constructed to have therein a central hole 18 (see FIG. 3) to fit over the shank 15. Each cutter base 17 has a number of fitted carbide teeth 11, the teeth 11 being spaced peripherally around the cutter base 17. As seen in FIG. 1, the first cutter base located closest to the shoulder of the shank 15 is called the "inner" cutter base, while the second and following cutter bases (only one second cutter base 17 is shown in FIG. 1) are called the outer cutter bases. When the teeth 11 on both the inner and the outer cutter bases 17 are identical, the teeth 11 are called "standard" teeth. When the teeth 11 on both the inner and the outer cutter bases 17 are uneven in size, only the teeth 11 on the outer cutter bases 17 need be "standard" teeth 11.

As seen in FIG. 1, the cutter bases 17 are held apart by a spacer 19. Depth cut joint component control is provided by a fence 20.

It is an important feature of the tool 10 that the width and depth of the grooves 26 and 27 are identical to the width and elevation of the central tongue that remains between the grooves in the wood piece 12. Thus the width of spacer ring 19 must be selected to ensure these relative dimensions. This guarantees that a joint component cut in one piece of wood will fit readily and precisely with the joint component of another wood piece regardless of whether they are cut in the ends, edges or sides of joining wood pieces.

FIG. 2 represents in side elevation view the rotary cutting tool 10, turned 90 degrees so that the tool operates in vertical orientation, rather than horizontal orientation. The tool 10 is mounted in the chuck of a hand operated portable router. The tool 10 illustrated in FIG. 2 does not include a fence 20 used to control the depth of the grooves cut in the wood piece 12 because the depths of the grooves are controlled by a freely rotating stop ring 22. This stop ring 22 rotates independently of cutter bases 17 and by being in stationary contact with the wood piece 30 ensures that the wood piece 30 (and joint component) is not burned which would happen if the wood was contacted by a rapidly rotating shaft. Stop ring 22 can be ball bearing mounted to provide ready rotation of the ring 22 on the shank 15. The position of the grooves cut by the teeth 11 in the wood piece 30 is determined by a simple adjustment of the cutting tool 10 relative to the guide 9 (shown as a table 9 in FIG. 1 or the base 9 in FIGS. 2, 4, 5 and 6). In the tool 10 depicted in FIG. 2, the width between the inner and outer cutter bases 17 and the teeth 11 (standard width as shown in FIG. 2) carried by each is precisely governed by two spacer rings 21, one positioned on each side of the stop ring 22. The spacer rings 21 may be independently arranged on the shank 15 or affixed to the sides of the respective inner and outer cutter bases 17, or on either side of the stopper ring 22, by welding or being machined as part of the cutter bases 17 or the stop ring 22. In FIG. 2, the grooves as shown are being cut in the end of a wood piece 30 which extends in the direction of the dotted line, to form an end joint component.

The spacer 19 in FIG. 1 and the ball bearing mounted stop ring 22 (see FIGS. 2, 4, 5 and 6) are disposed between the inner and outer cutter bases 17 to provide that the teeth on the respective inner and outer cutter bases 17 have between them a space which is equal to the slotting width of a standard tooth 11. The elevation of the stop ring 22 controls the depth of cut of the groove 26 or 27. By using this stop ring 22 on all joint cutters 10, instead of the spacer 19 in FIG. 1, the joint cutter 10 will be instantly adaptable to any router and need not be changed when the tool 10 is switched from a stationary to a portable router.

FIG. 3 illustrates in side elevation view the construction of the two cutter bases 17 disposed side by side. Each cutter base carries three teeth 11, disposed at equal distances around the circumference of the cutter base 17. The central hole 18, which fits against the shank 13 and the spacer ring 21 (dotted circle) are also shown.

The respective dual cutter bases 17 in FIG. 3 and the teeth on each are staggered relative to one another for better clearing of wood. In each case, the cutter bases 17 and stop ring 22 are held securely in place by a washer 23 and a nut 16 (see FIGS. 1 and 2).

FIG. 4 illustrates the manner in which tongues and grooves are cut in the edge region of a wood piece 12, only part of which is shown by means of the dotted line, to produce a corner joint component 29. FIGS. 1, 2 and 4 illustrate identical (standard) carbide teeth 11 on the pair of joint cutters 17, which are shaped so that they taper in the direction of the centre of the cutter base 17. This shape of tooth 11 is sharpened at the end and is used to cut a rectangular groove shape in a single thickness of wood piece 12.

In FIG. 5, an alternative cutting tool 10 is shown which has one set of standard width teeth 11 and a second set of oversize width teeth 24 on the inner cutter base 17. As shown, the teeth 11 and 24 are constructed to cut grooves with flared walls in the wood piece 12 by being sharpened at both the ends and sides of the teeth 11 and 24. The cutting tooth 24 is relatively broad and is straight on one side 25 (closest to the shoulder 13) to reduce sharpening costs.

FIG. 6 illustrates the alternative shapes of teeth 11 and 24 respectively (moved to the left relative to FIG. 5) which are useful in cutting grooves in various oversize thicknesses of wood pieces 12. The degree of oversize is indicated by the two vertical straight dotted lines. In the alternative tooth shape embodiment illustrated in FIGS. 5 and 6, it must be noted the notwithstanding the differences in shape and width of the respective teeth 11 and 24, it is still a critical feature of the joint cutter tool 10 that the relative effective widths of the teeth 11 and 24, and the tongues of wood left between the grooves when cut by the teeth 11 and 24 are commensurate. In FIG. 6, the wider groove cut by tooth 24 is equivalent to the wider tongue remaining at the left side of the wood piece 12 as shown in FIG. 6.

Furthermore, the joint cutter tool 10 illustrated in FIGS. 5 and 6 has wedge-like teeth 11 and 24 to cut tapered tongues and flared grooves for easier assembling of a joint as shown in FIG. 8. FIGS. 5 and 6 show teeth 24 on the inner cutter base with one non-cutting side and FIG. 6 shows inner cutter base with broader teeth 24 for the purpose of covering a variation of oversize wood thicknesses as indicated by the dotted lines with one joint cutter tool 10.

As can be seen in FIGS. 2, 4, 5 and 6, the twin cutter bases 17 are spaced apart by spacer rings 21 positioned on either side of independently rotatable stop ring 22. Depth of cut control is governed by stop ring 22 which in effect takes the place on the fence 20 illustrated in FIG. 1. The depth of groove that can be cut in the wood piece 12 is therefore in each instance governed with precision. The cutter bases 17 are held securely in place by washer 23 and nut 16, on shank 15.

FIG. 7 illustrates the manner in which the joint cutter 10 can be used to produce a corner joint 31 by combining an edge joint component cut according to the illustration in FIG. 4 with joint component 30 cut according to the illustration in FIG. 2. In FIG. 7, it is important to note that the respective dimensions noted by arrows 26 and 27 (two of each) are identical so that the components forming the joint will fit. Using a tool 10 which has widths of the teeth identical with the widths of the spaces between the teeth, and using the same tool 10 for cutting all joint components, both edge, side and end joint components, ensures that precision fitting joints will be formed. FIG. 8 illustrates a joint which is useful for assembling wood pieces 12 in end-to-end or edge-to-edge relationship.

FIG. 9 illustrates the versatility of the joint by depicting in exploded plan view that joint components can be cut in the ends, the edges and the sides of particular wood pieces to form a cubically shaped article such as a drawer or cabinet. The four side wood pieces 33, 34, 35 and 36 illustrated in FIG. 9, and the end piece 37 (see FIG. 10), when assembled in the manner shown, provide an article which has very closely fitting edges. It will be noted that the type of joint components (edge, side or end joints) cut in the respective pieces 33, 34, 35 and 36 correspond with one another on opposing faces. FIG. 9 also illustrates the manner in which tongues 38 and grooves 39 are cut in the four side wood pieces 33, 34, 35 and 36. FIG. 10 illustrates the manner in which tongues 40 and grooves 41 are cut around the sides of one of the broad surfaces of a square end piece 37 which fits precisely into the end of the assembled side pieces 33, 34, 35 and 36. FIG. 11 shows the four side pieces assembled together so that they can receive the end piece 37. The tongues 40 and grooves 41 fit precisely with the tongues 38 and grooves 39 at the edges of the four side pieces 33, 34, 35 and 36. Thus, a joint component, which is of only one basic shape, namely, a pair of grooves alternating with a pair of tongues of width equal to the width of the corresponding grooves, can be formed in the edges, sides and ends of wood pieces, using only one tool 10, and the pieces assembled in a large number of combinations. FIG. 12 illustrates in general perspective view the end piece 37 fitting into and assembled with the four assembled side pieces 33, 34, 35 and 36.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

1. A method of preparing a construction material joint component through use of a rotary tool, comprising the steps of:
   (a) securing a shank to said tool whereby said shank rotates on an axis when said tool is operated;
   (b) providing said tool with a guide;
   (c) securing a first cutting base to said shank adjacent said guide whereby said first base is rotatable with said shank and said first base has a plurality of peripherally disposed cutting teeth;
   (d) mounting at least a first spacer to said shank adjacent said first base;
   (e) securing a second cutting base to said shank adjacent said at least a first spacer whereby said second base is rotatable with said shank and said second base has a plurality of peripherally disposed cutting teeth;
   (f) connecting a depth guide to said tool;
   (g) providing a construction material;
   (h) operating said tool and thereby rotating said cutting bases;
   (i) engaging a peripheral surface of said material with said guide and feeding said material into cutting engagement with said teeth;
   (k) maintaining said construction material peripheral surface against said guide;
   (l) removing a portion of the peripheral surface in contact with said guide and thereby forming an outer groove and while forming said outer groove simultaneously forming an inner groove spaced from said outer groove by a tongue and forming said tongue by maintaining said first cutting base inner surface a fixed distance from said second cutting base outer surface and cutting said second groove inner surface parallel to said first groove inner surface and forming said tongue in said material to have a cross sectional configuration substantially equal to the cross sectional configuration of said second groove so that at least the width of the top of said tongue substantially equals the width of the bottom of said second groove and width of the base of said tongue substantially equals the width of the tope of said second groove;
   (m) continuing to feed said material until the peripheral surface engages said depth guide and thereby finishes cutting said grooves; and, (n) removing said finished work piece from engagement with said guide.

2. The method of claim 1, including the further steps of:
(a) providing a second piece of construction material;
(b) operating said tool and thereby rotating said cutting bases;
(c) engaging a peripheral surface of said second piece of construction material with said guide and feeding said second piece of construction material into cutting engagement with said teeth; and,
(d) continuing to feed said second piece of construction material toward said bases and thereby providing said second piece of construction material with an inner and an outer groove separated by a tongue and said inner and outer groove and said tongue of said second piece of construction material conforming to said inner and outer groove and said tongue of said construction material whereby said second piece of construction material is thereby adapted for being connected to said construction material and said tongue of said second piece of construction material is received within said inner groove of said construction material.

3. The method as defined in claim 1, including the further steps of:
(a) providing said second cutting base teeth with oppositely angularly oriented inner and outer surfaces;
(b) providing said first cutting base teeth outer surface with an angled surface parallel to said second base teeth outer surface;
(c) operating said tool and feeding said construction material into cutting engagement therewith; and,
(d) cutting said inner and outer grooves and thereby providing a tongue with an angularly disposed inner and outer surface wherein the top of said tongue has a width exceeding the width of the base of said tongue.

4. The method as defined in claim 1, including the step of:
(a) angularly staggering said teeth of said first cutting base with respect to said teeth of said second cutting base for thereby permitting better clearing of said construction material.

5. The method as defined in claim 1, including the step of:
(a) connecting said depth guide to said guide and thereby providing a fence adapted for engaging said peripheral surface and thereby controlling the depth of said grooves.

6. The method as defined in claim 1, including the steps of:
(a) mounting a freely rotatable stop ring to said shank adjacent said at least a first spacer and thereby providing said depth guide; and,
(b) securing a second spacer to said shank adjacent said stop ring and thereby positioning said second cutting base.

7. The method as defined in claim 6, including the step of:
(a) cutting said grooves until said stop ring peripheral surface engages said construction material peripheral surface and thereby controlling the depth of said grooves.

8. The method as defined in claim 6, including the step of:
(a) providing a stop ring having a diameter exceeding the diameter of said spacers.

9. The method as defined in claim 1, including the step of:
(a) securing a nut to the outer end of said shank and thereby maintaining proper positioning of said cutting bases and said at least a first spacer.

10. The method as defined in claim 1, including the steps of:
(a) providing said teeth of at least said second cutting base with a terminal edge having a width exceeding the width of the inner edge; and,
(b) rotating said bases and feeding said construction material into cutting engagement therewith and thereby cutting a generally rectangular inner groove.

11. The method as defined in claim 1, including the step of:
(a) providing a construction material consisting essentially of wood.

12. The method as defined in claim 1, including the steps of:
(a) providing a construction material having a rectangular shape; and,
(b) cutting said grooves into at least one end of said construction material.

13. The method as defined in claim 1, including the steps of:
(a) providing a construction material having a rectangular shape; and,
(b) cutting said grooves into at least one side of said construction material.

14. The method as defined in claim 12, including the step of:
(a) cutting said grooves into at least one side of said construction material.

15. The product of the method as defined in claim 2.

16. The product of the method as defined in claim 12.

* * * * *